US005353887A

United States Patent [19]

Putnam

[11] Patent Number: 5,353,887

[45] Date of Patent: Oct. 11, 1994

[54] HOUSEHOLD TRASH DELIVERY SYSTEM

[76] Inventor: John Putnam, 417 E. Broadway, Port Jefferson, N.Y. 11777

[21] Appl. No.: 13,581

[22] Filed: Feb. 4, 1993

[51] Int. Cl.[5] .............. B60T 7/16

[52] U.S. Cl. .............. 180/168; 198/750; 104/246; 104/67

[58] Field of Search .............. 180/168; 198/750; 446/441, 442; 104/242, 245, 246, 67, 118

[56] References Cited

U.S. PATENT DOCUMENTS

| | | | |
|---|---|---|---|
| 875,685 | 1/1908 | Bighouse | 104/172.3 |
| 2,123,143 | 7/1938 | Morris et al. | 446/442 |
| 3,066,616 | 12/1962 | Weisberg | 104/172 |
| 3,331,153 | 7/1967 | Woods | 446/442 |
| 3,834,319 | 9/1974 | Kastenbein | 104/246 |
| 4,092,931 | 6/1978 | Wulf et al. | 104/242 X |
| 4,467,726 | 8/1984 | Aldous et al. | 104/246 |
| 4,473,333 | 9/1984 | Stuart | 414/493 |
| 4,780,817 | 10/1988 | Lofgren | 180/168 X |
| 5,007,214 | 4/1991 | Itami | 52/66 |
| 5,009,168 | 4/1991 | Kutcha | 104/172.1 |
| 5,042,642 | 8/1991 | Ulrich | 198/750 |
| 5,054,601 | 10/1991 | Sjogren et al. | 198/365 |
| 5,065,703 | 11/1991 | Lee | 122/382 |
| 5,074,704 | 12/1991 | McKay | 404/6 |
| 5,096,049 | 3/1992 | Anderson | 190/250 |
| 5,189,612 | 2/1993 | Lemercier et al. | 180/168 |
| 5,245,335 | 9/1993 | Hill et al. | 180/168 |

OTHER PUBLICATIONS

Jessica Stern, "Houston Mixes Modes", Railway Age, Jun. 1991.

David Bak, "Flat Ways Make Monorail More Accurate", Design News, Aug. 6, 1990, p. 101.

McMaster, Inc. catalog, "Door Tracks and Brackets", p. 778.

*Primary Examiner*—Margaret A. Focarino
*Assistant Examiner*—Christopher P. Ellis
*Attorney, Agent, or Firm*—Alfred M. Walker

[57] ABSTRACT

A household trash delivery system having a guidance member moveable within a track. The cart is controlled by a programmable timer to send the cart from a household location to a curbside destination at a desired time, and the return of the cart from the curbside destination to the household destination at a second desired time. The cart may be elevated above obstacles adjacent to the track such as a mound of snow and has a built in pressure sensitive system to cut off power temporarily if it encounters an obstacle such as a small child within the path of the cart.

9 Claims, 10 Drawing Sheets

Fig. 1B
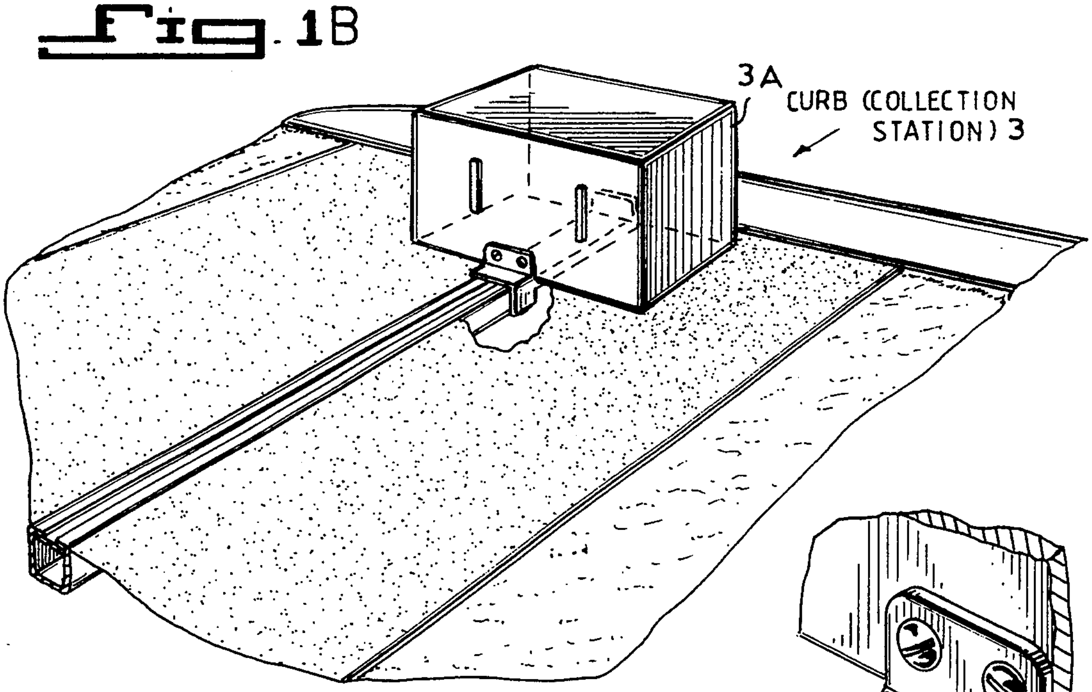
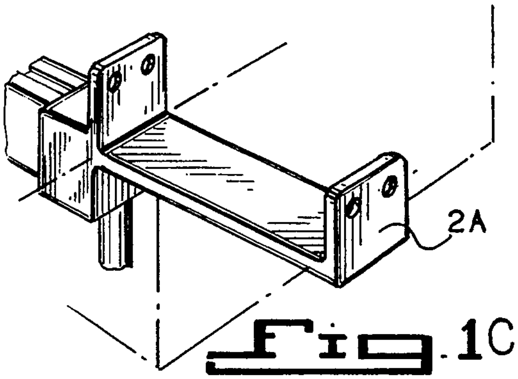
Fig. 1C
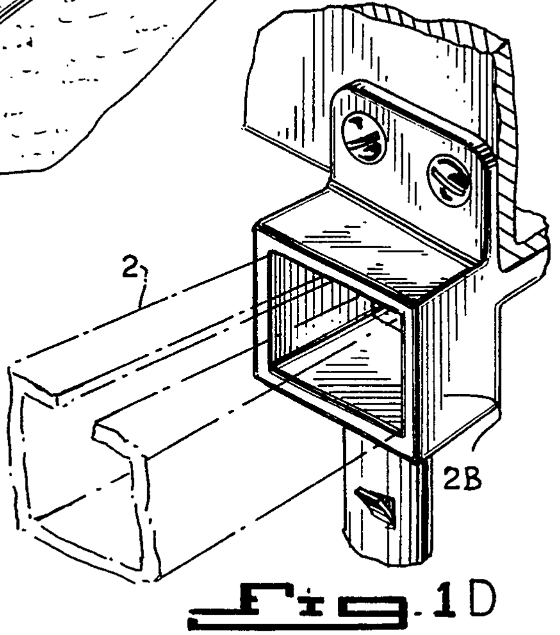
Fig. 1D
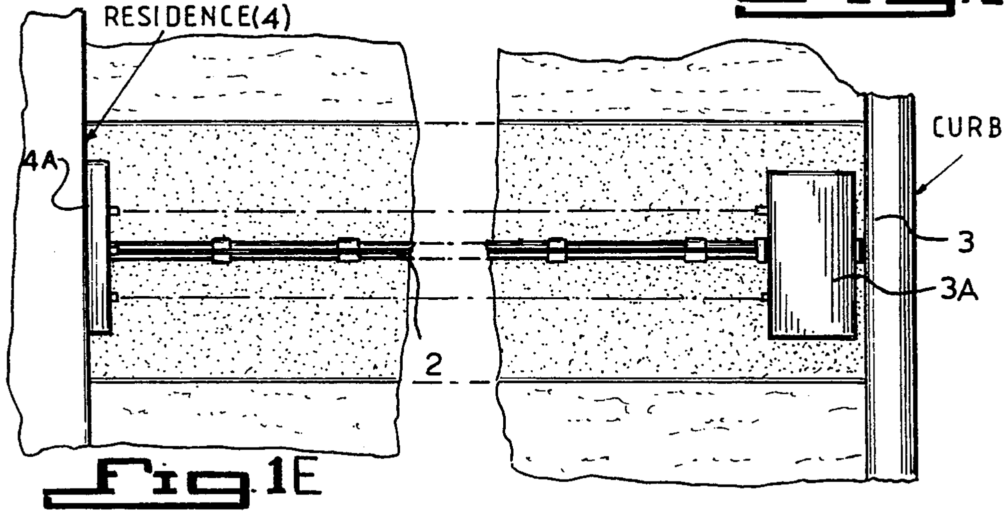
Fig. 1E

FIG. 9
(PASSENGER / INVALID TRANSPORT)
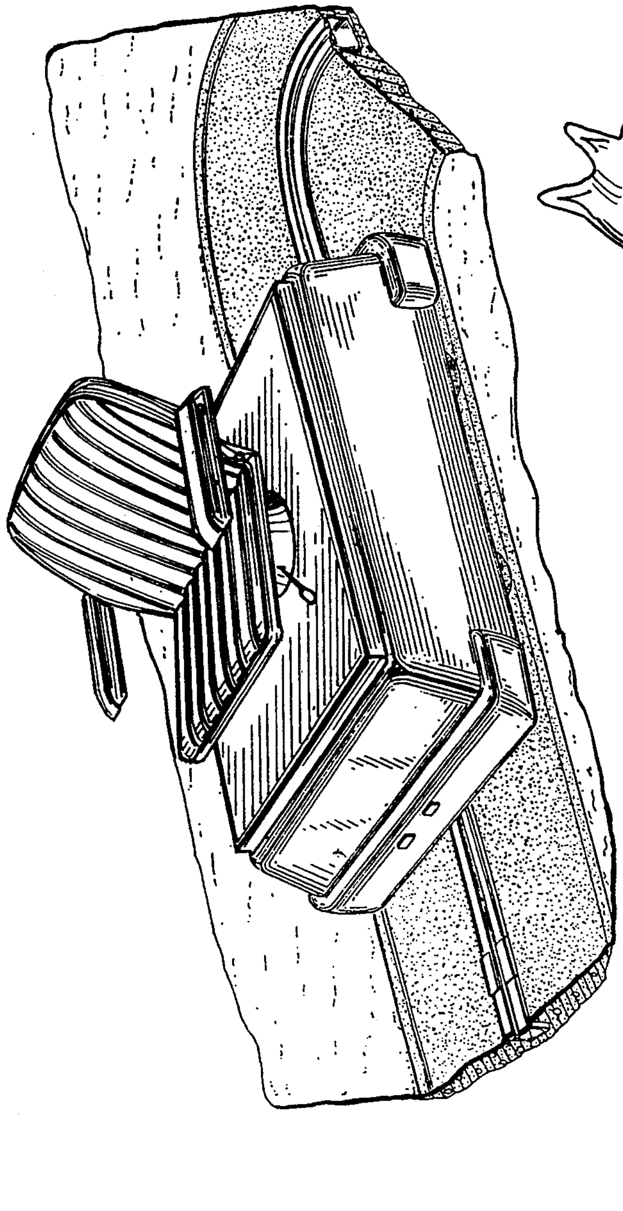
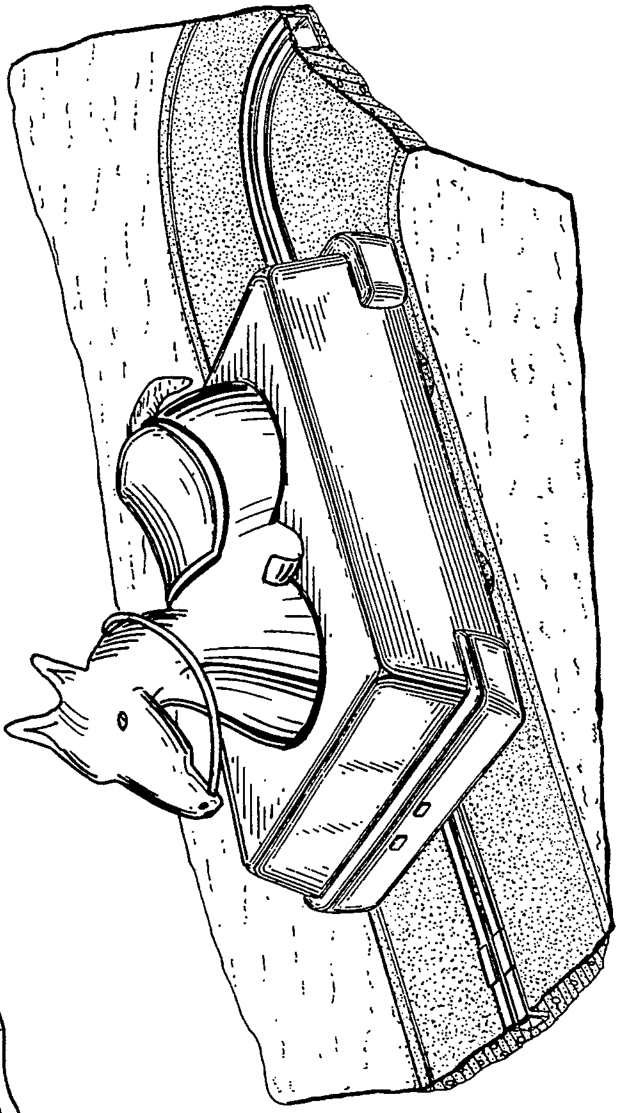
FIG. 10
(CHILD/ADULT RECREATION)

HOUSEHOLD TRASH DELIVERY SYSTEM

This invention relates to a household trash delivery system extending from a house to a curbside pick-up area. The trash is carried on a cart which will remain at a street end of the track until a predetermined programmed time for a pickup, at which time the cart returns to the house.

FIELD OF THE INVENTION

Various attempts have been made to provide household trash delivery systems. Among these devices those described in Ullrich, U.S. Pat. No. 5,042,642, for a household trash delivery system on a track, wherein the cart is moved by continuous chain conveyor. Another system is described in U.S. Pat. No. 4,473,333 for a refuse handling device, wherein a rectangular refuse container is provided for loading on to a refuse transport vehicle. In Weisberg, U.S. Pat. No. 3,066,616, a remote home mail and newspaper delivery system is provided wherein the mail box is moved by continuous chain from a street side location to a house location.

The disadvantages of the devices disclosed in the Ullrich '642 Patent and Weisberg '616 Patent are that the vehicles are powered by a continuous chain, which is subject to breakage and operating problems in inclement weather, including being subject to inoperability when snow is on the ground.

Other tray cart type carriers are found in U.S. Pat. No. 5,074,704, discloses a roadway barrier system including a transfer vehicle, U.S. Pat. No. 5,065,703 for a sludge transport vehicle having horizontal wheels, and U.S. Pat. No. 5,054,601 for a conveyor with a single vertical wheel and two horizontal wheels for guiding the carrier along a track. U.S. Pat. No. 5,009,168 discloses a track vehicle with horizontal wheels, and U.S. Pat. No. 5,007,214 discloses a different openable dome-shaped roof structure wherein a section of the roof moves on a track. It has also been known in the art to provide an apparatus for transporting passengers wherein the carrier and trucks have vertical and horizontal wheels inside a track. Moreover, other track operable carriers include monorail trains, which trains are vehicles moving on circular rollers within a track, as described in a newspaper article entitled "Houston Mixes Modes" in the June 1991 issue of *Railway Age* Magazine, page 65 and "Flatways Make Railways More Accurate" by David Bak in *Design News*, Aug. 6, 1990, page 101.

The prior art patents have limitations for track mounted vehicles, in that vehicles do not move garbage in a movable cart which is programmable to stop at a curb, which cart is able to negotiate above snow-laden tracks.

OBJECT OF THE INVENTION

It is therefore an object of the present invention to provide a movable garbage cart traveling between a house and the curbside.

It is a further object of the invention to provide a movable garbage cart wherein the cart is timer controlled.

It is a further object of the invention to provide a movable garbage cart which can negotiate around curves of a track.

It is a further object of the invention to provide a movable cart which may be raised to overcome obstacles such as a small mound of snow.

It is a further object of the present invention to provide a remote controlled cart which may be stopped if a small child stands in the path of the track.

It is a further object of the invention to provide a vehicle which may move in two directions by means of a programmable timer.

It is a further object of the invention to provide a cart which is not subject to tipping around curves.

It is a further object of the invention to provide a cart which minimizes friction within a track means.

SUMMARY OF THE INVENTION

The present invention seeks to overcome the disadvantages of the prior art by providing a household cart vehicle which travels between the house and the curbside, wherein the cart is timer controlled and electrically motor powered. Furthermore, the cart, although travelling on a track, is able to negotiate over impediments such as a small mound of snow upon the tracks.

For locomotion, the present invention vehicle is free of any chain or conveyor, thereby providing its use in any kind of weather. The vehicle cart is able to negotiate around curves and over patches of snow without deviating from the track.

The present invention is activated by an impulse charge from a programmable timing unit located in a house. When an electrical charge, typically a 12 volt impulse, hits a relay contact located in the cart, the relay causes an electrical contact supplying power to the reversible drive motors. The battery, also located in the cart, is a rechargeable battery. Relay contacts remain engaged until the cart reaches the other end of the track.

The cart of the present invention has large bumper type safety switches located at either end for a safety shut off, in case the cart comes in contact with an object on the track, such as small child, and also at the end of the destination shut off location. However, if the impediment is a small accumulation of snow around the tracks, the cart is able to lift up above the track and accumulated snow, while built-in guidance members remain within the hollow track, within which the guidance members travel. These bumper safety switches release the reversible drive motor electric contacts. Thereby, electric power is removed from the motor when one of the bumper safety switches is actuated upon the trash cart encountering the end of its travel or an obstacle in its path.

The trash cart will remain at the street end of the track until the timed programmer supplies voltage to the return cycle. Typically, steering diodes are used to protect the battery supply from the programmer output. The electronics within the cart itself are protected by a fusible link.

At the house destination end of the track, three magnetic contacts are used. One contact is for the positive end of the programmable timer, the second contact is for the battery charger positive lead, and the third contact is for a common ground for the two other contacts.

At the opposite driveway end of the track, only two magnetic contacts are required, since the battery is only recharged at the house. One of the contacts at the driveway is for a positive programmable timer, and the other one is for a negative programmable timer.

Optionally, at the house end, a permanent trickle carrier may be used; which trickle carrier is automatically plugged in when the cart is in the house end position, wherein both the charger and the programmable timer are located within the house.

The vehicle includes a cart having a drive wheel which is disposable to the ground, as well as one or more steering guidance mechanisms, which guidance mechanisms include horizontal wheels within a track, typically a garage door track, such as manufactured by McMaster, as shown in its catalog for "Door tracks and brackets", on page 778. The steering guides attach to a steering connector post, which post is exposed to the main body chassis for the vehicle by means of a hole, wherein the steering connector post rides within When the vehicle encounters a small mound of snow, it will automatically raise upward by movement of the chassis about the steering connector posts.

The cart is moveable by a single drive wheel powered by an electric motor, the source of power of which is a typically rechargeable battery. The battery is rechargeable at the house end of the track One or more rigid axles are provided with steering support wheels for moving the cart forward and back about the track. However, the steering of the cart is mainly accomplished by the longitudinal movement of the steering guide within the track itself.

The steering guide mechanism riding within the track includes horizontal wheels, which wheels move within the track against the vertical side walls of the track. Ball bearings are provided on the underside of the steering guide means, which ball bearings are disposed to the bottom horizontal wall of the track, thereby enabling the vehicle to negotiate around curves.

Optional use of the cart as a riding chair or child recreational carrier may be provided, in lieu of the use as a trash receptacle for recreational purposes. Other and further details of the present invention are hereinafter described with reference to the accompanying drawings.

DESCRIPTION OF THE DRAWINGS

The aforementioned objects are accomplished by the present device with reference to the accompanying drawings, in which:

FIG. 1B is a perspective view of the curbside end portion of the system.

FIGS. 1C and 1D are close-up perspective views of supports for the track portion of the device.

FIG. 1E is a segmented top plan view of the trash and cart delivery system.

FIG. 9 is an alternate perspective view

FIG. 10 is a perspective view of an alternate version of the device for recreational purposes.

DETAILED DESCRIPTION OF THE PREFERRED EMBODIMENT

Figure 1:
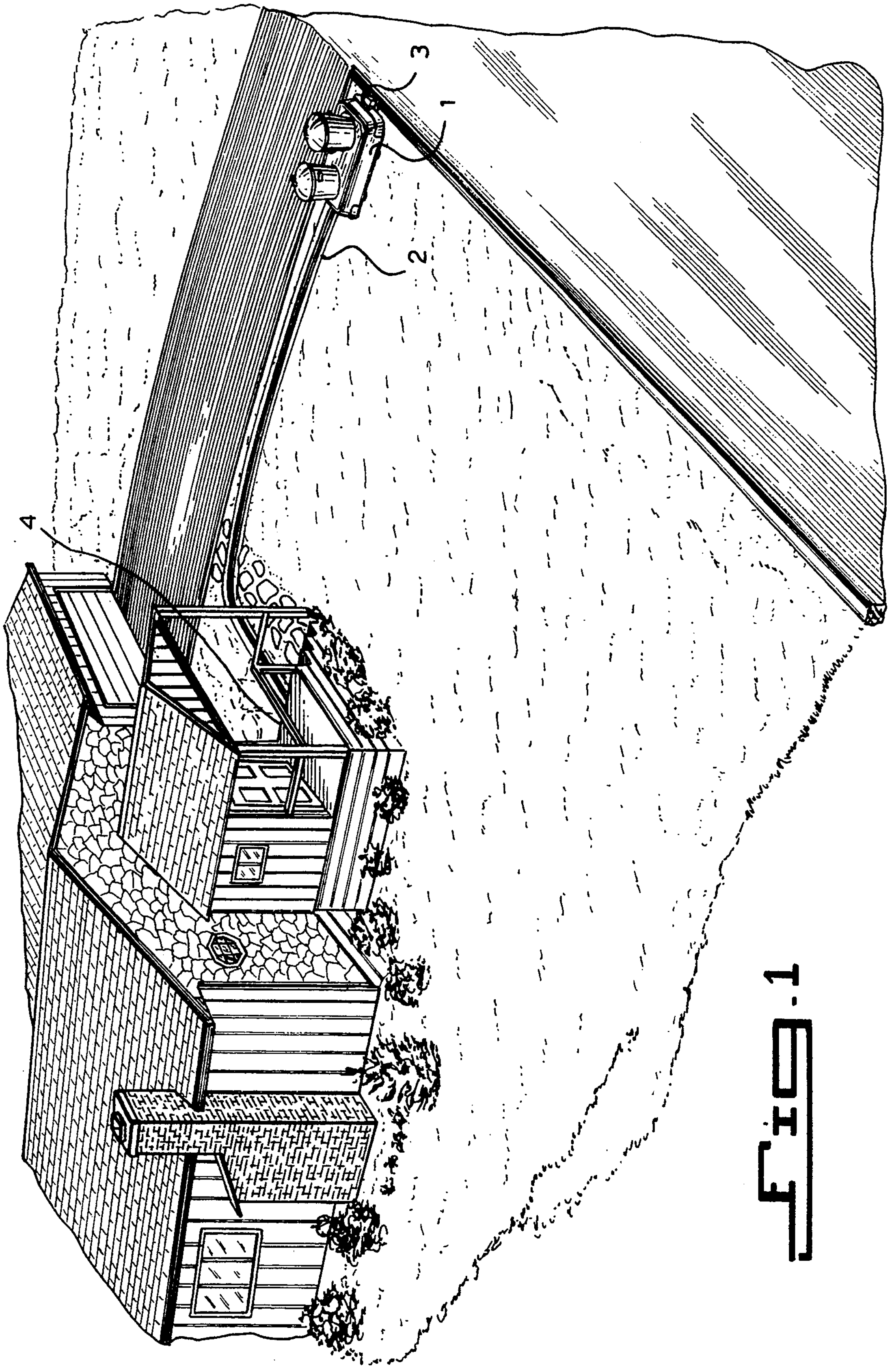
FIG. 1 is a perspective view of the trash cart delivery system, wherein the cart is at the curbside end location.

Referring to the drawings as shown in FIG. 1, there is provided a trash removing cart 1 movable about a track 2 between a curb location 3 and a house location 4.

Figure 1A:
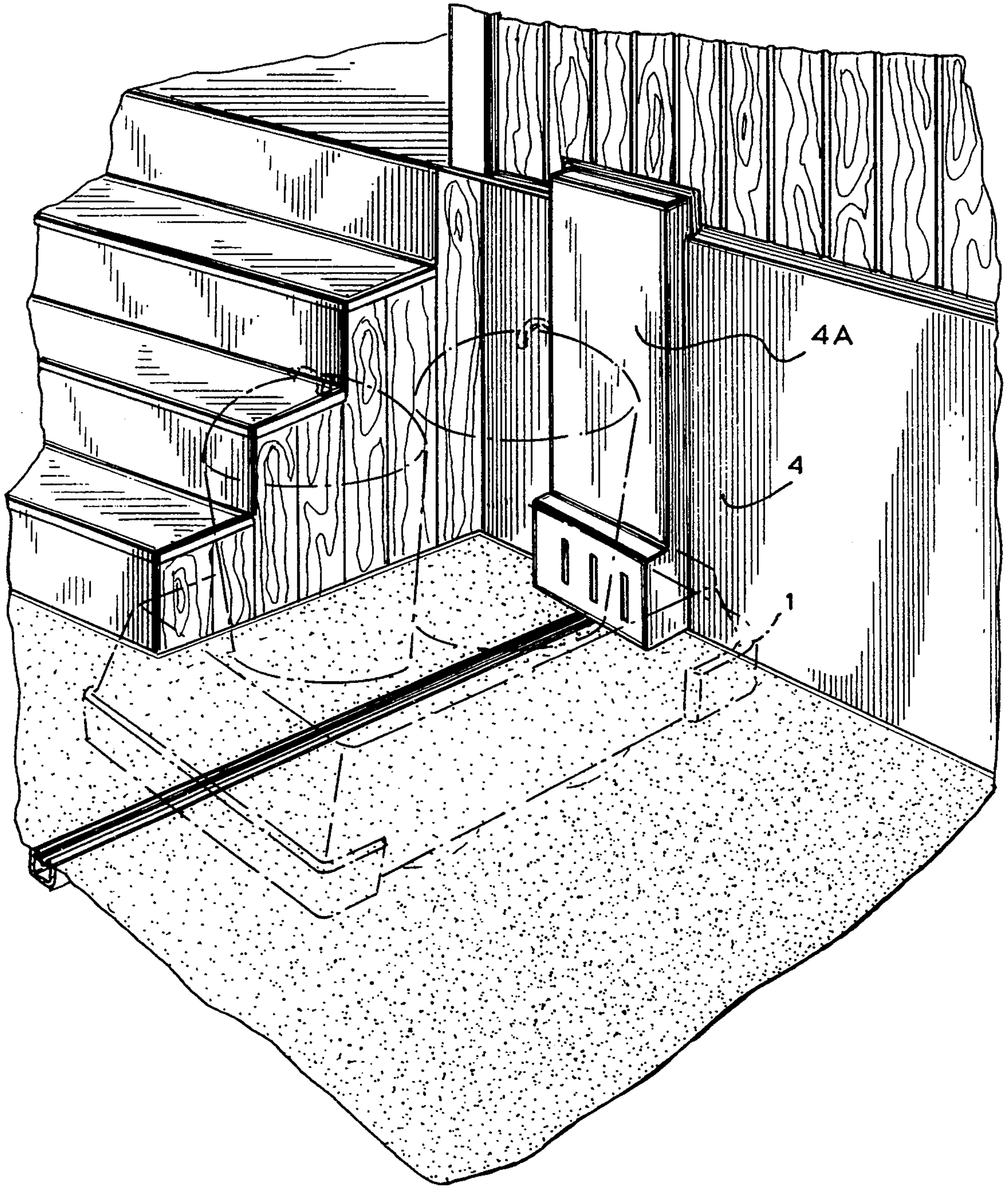
FIG. 1A is a perspective view of the household end portion of the system.

FIG. 1A depicts in broken lines, the position of cart 1 at the household destination end. Receptacle **4*a* is provided with three electrical contacts, two for a battery charger 48 and one for a programmable timer 70. FIG. 1*b* shows a corresponding receptacle 3A having two electrical contacts for contacting with vehicle cart 1 at curbside location 3**.

FIG. 1C shows one brace beam 2A for track 2, and FIG. **1*d* shows one brace collar 2B for supporting track 2** therein.

FIG. 1E is a segmented top plan view of the household side 4 and curbside 3 locations for track 2.

Figure 2:
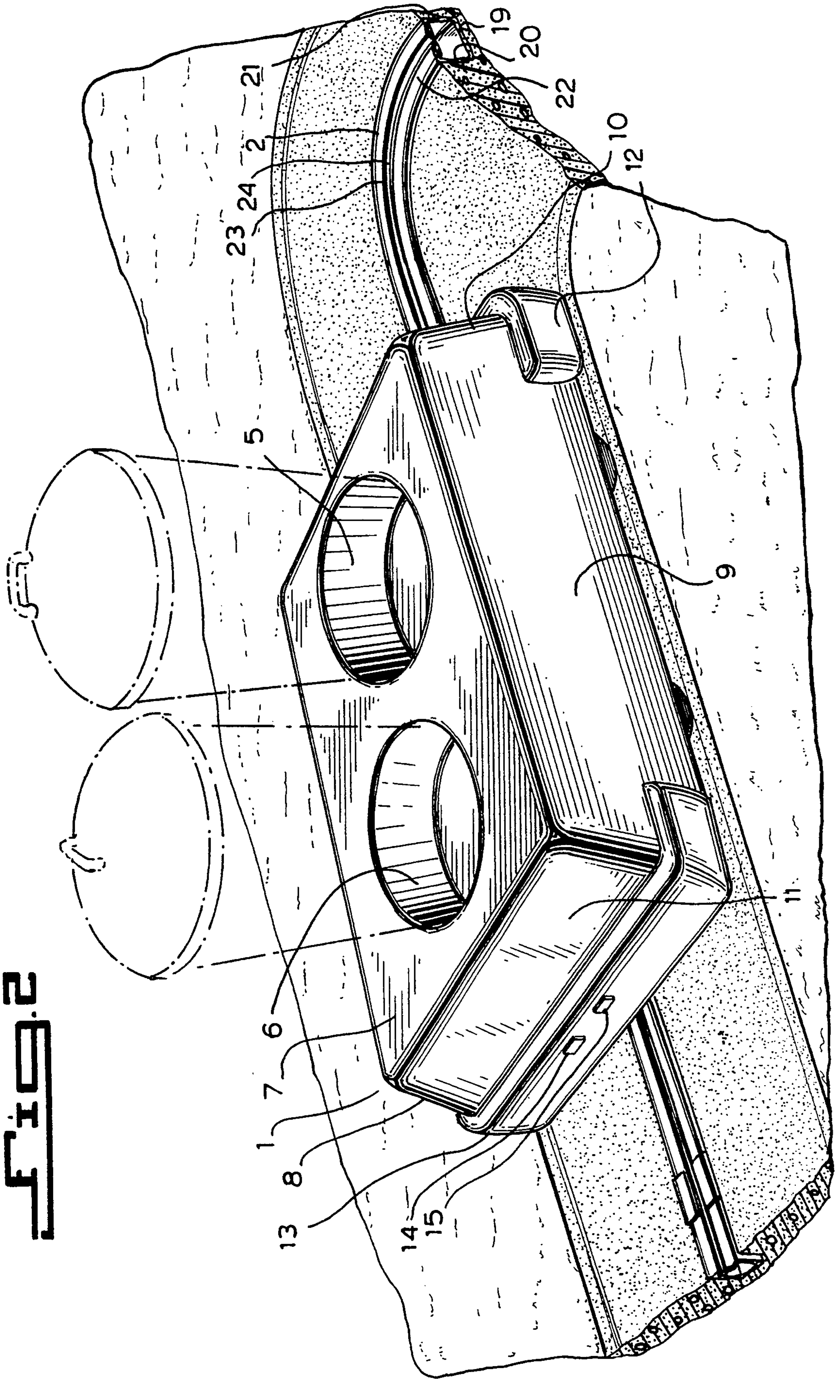
FIG. 2 is a close-up perspective view of the trash cart and a section of the track.

As shown in FIG. 2, the cart 1 has receptacles 5 and 6 for the placing of trash within a top portion 7 of the cart 1, which top portion 7 is joinable to side portions 8 and 9, and front portions 10 and 11 of the cart 1. The cart is provided with bumpers 12 and 13. A series of magnetic contacts 14 and 15 are provided within the bumpers. A further series of contacts 16, 17 and 18 are provided. The track 2 includes a generally rectangular shape, having a bottom portion 19, and two side walls 20 and 21. Upper top portions 22 and 23 are separated by a gap 24 within which a track guidance steering guide member, such as steering guides 25 and 26, as shown in FIG. 3.

Figure 3:
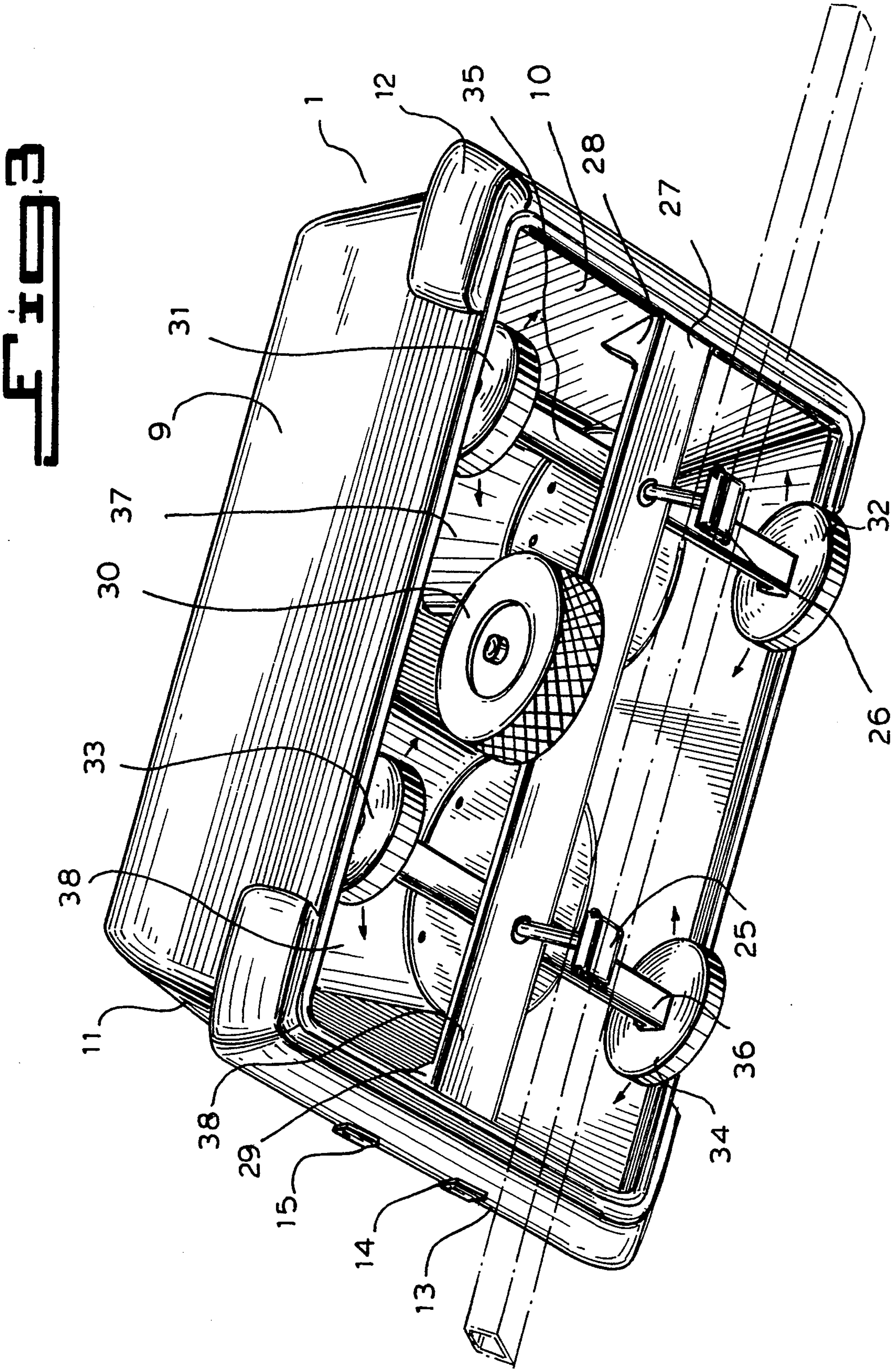
FIG. 3 is a bottom perspective view of the track vehicle, showing the track with dotted lines.

As further shown in FIG. 3, there is provided a chassis 27 having brackets 28 and 29 for attaching front wall 10 and rear wall 11 of a cart to the chassis 27. The cart 1 is powered by a single drive wheel 30. The movement is balanced by a plurality of wheels 31, 32, 33 and 34. Steering support wheels 31 and 32 are connected by rigid axle 35 and steering support wheels 33 and 34 are connected by rigid axle 36, which axles 35 and 36 are disclosed to chassis 27 of the cart 1. The trash cans are held within trash receptacles 37 and 38, which are integral with the trash cart 1. The cart 1 also includes bumpers 12 and 13 having contacts 16,17 and 18, and 14 and 15, respectively exposed thereon.

Chassis 27 also includes main frame 38 between brackets 28 and 29.

Figures 4, 4A:
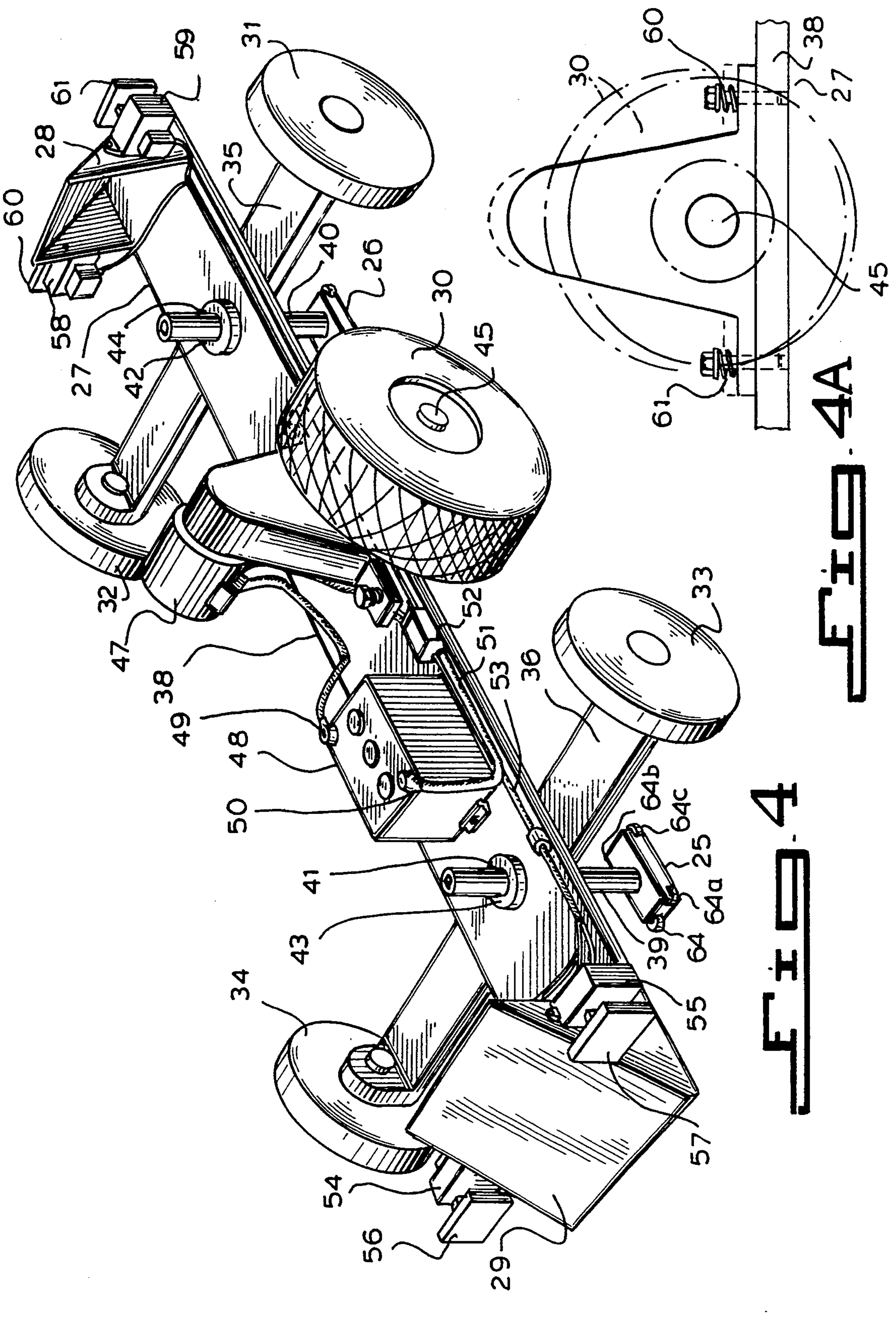
FIG. 4 is a perspective view of the chassis of the trash cart.
FIG. 4A is a side elevation view of the wheel mounts of the trash cart.

As shown in FIG. 4, the steering guide 25 and 26 are connected to steering connector posts 39 and 40; which steering connector posts 39 and 40 are movable within respective cavities 41 and 42 of main frame 38 of chassis 27. Smooth movement is accomplished by insertion of the steering connector posts 39 and 40 within bearings 43 and 44, each having a plurality of ball bearings therein.

Figures 4B, 4C:
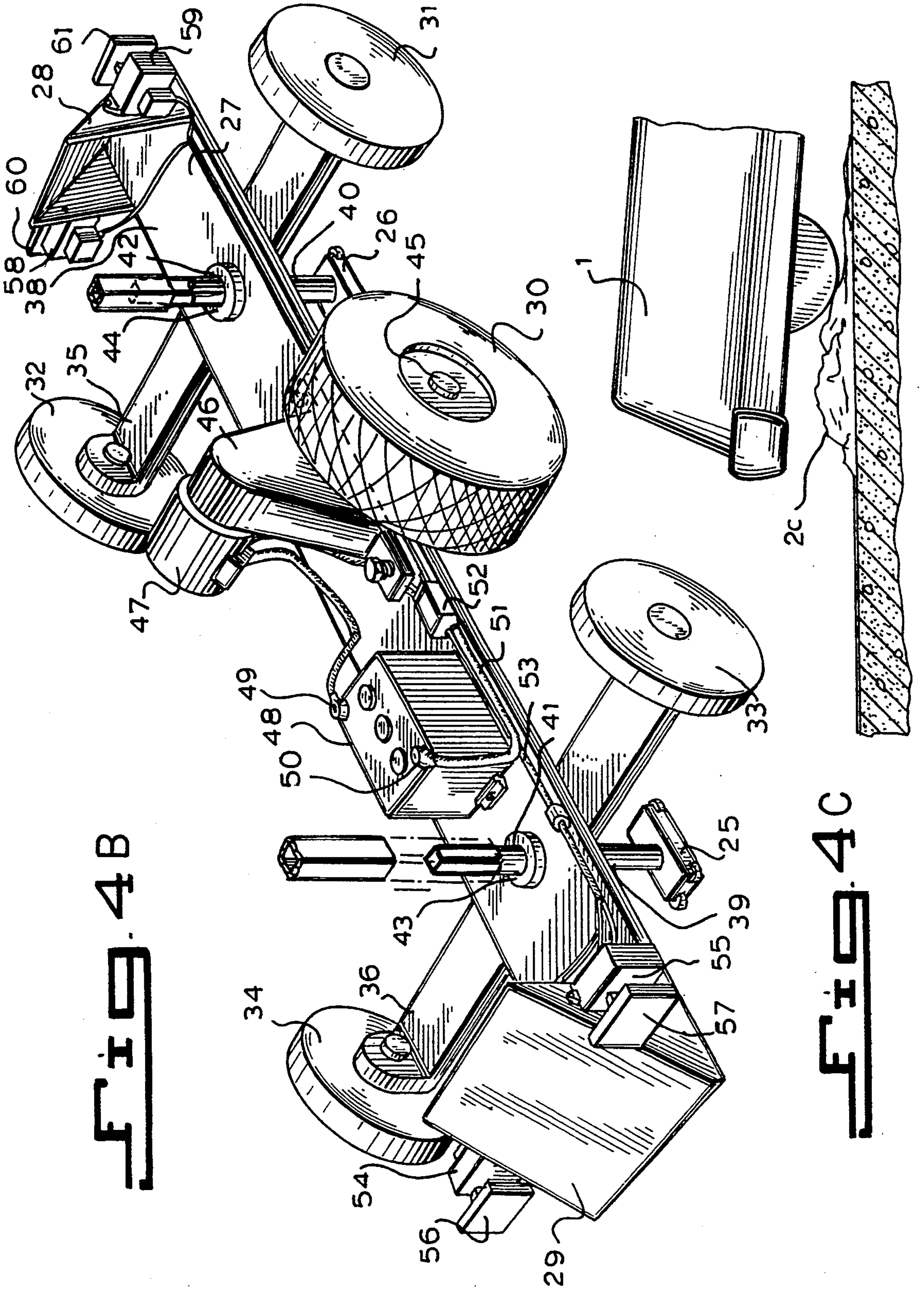
FIG. 4B is a perspective view of another embodiment of the chassis of the trash cart.
FIG. 4C is a close up view of the front of the trash cart encountering a snowpile obstacle.

As shown in FIGS. 4B and 4C, when the bumpers 12 and 13 of the vehicle encounter an obstacle such as a small mound of snow 2C, the vehicle 1 will automatically raise up above the steering guides 25 and 26 within track 2, to continue moving despite the obstacle of snow by means of the rising of cart 1 about steering connector posts 39 and 40 within bearings 41 and 42.

Drive wheel 30 is connected to axle 45, which axle 45 is further connected to hub 46, having conventional pulleys, and gears connections to electrical motor 47, which electric motor 47 is powered by power source 48, such as a 12 volt battery disposed to main frame 38 of chassis 27. The battery 48 has two contacts, one contact for the non-connecting to the electric motor 47, and a further contact 50 which is disposed by means of connecting wire 51 to relay 52. Relay 52 is further connected by wire harness 53 to blocks 54 and 55, having disposed thereon magnetic contacts 56 and 57. Blocks 54 and 55 are disposed to bumper 13 at one end of vehicle cart 1.

At the other end of the vehicle cart 1, further vehicle blocks 58 and 59 are connected to magnetic contacts 60 and 61 for contact with bumper 12 at the opposite end of the cart vehicle 1.

Rigid axles 35 and 36 steer the cart, because the drive wheel 30 powers the vehicle straight ahead. The wheels 31,32 and 33,34 are movable about the rigid axles 35 and 36 respectively to prevent tipping and shifts of the vehicle around curves. Relay 52 receives a 9 volt charge from the battery 48, which closes the relay 52 and activates the motor 47 for the cart, until the cart 1 contacts the other end of the destination, namely either the household end 4 or the curbside end 3.

As shown in FIG. 4A, the drive wheel 30 is attached to the main frame 38 of chassis 27, and by hub 46, having spring loaded shock absorbers 60 and 61.

Figures 5, 6, 7:
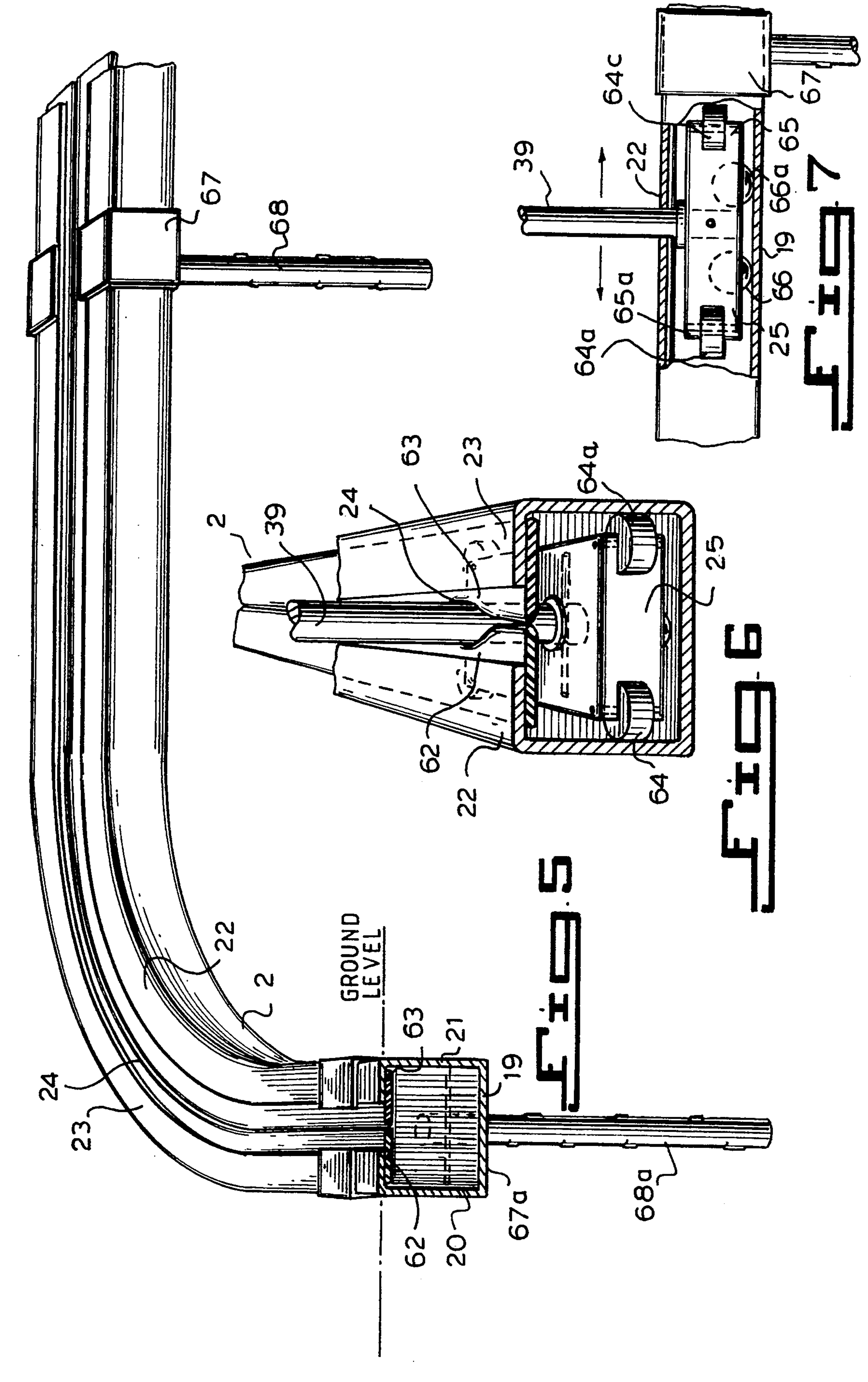
FIG. 5 is a perspective view of a section of the track in partial section.
FIG. 6 is a perspective view and partial section and close-up of a portion of the track guide member within a portion of the track.
FIG. 7 is a side elevation view of the track guide member in proportion to the track in partial section.
Figure 8:
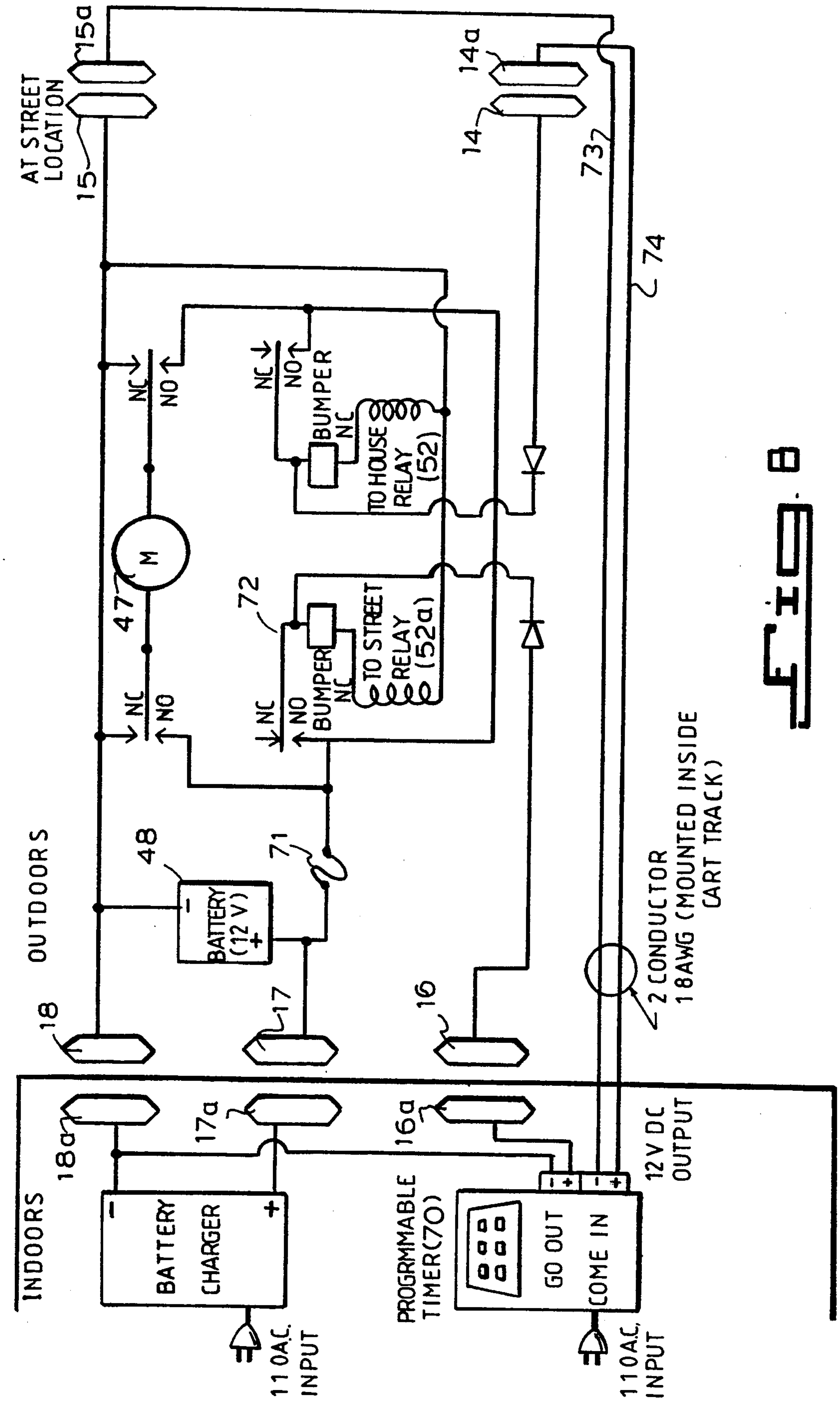
FIG. 8 is electrical schematic of the device.

As shown in FIG. 5, the track means 2 has horizontal bottom walls 19 and vertical walls 20 and 21, as well as top walls 22 and 23, separated by gap 19. Beneath the top walls 22 and 23 are provided a neoprene gaskets 62 and 63, which are closely adjacent to each other, so that steering connector posts 39 and 40 may travel therein smoothly.

Steering guide 25 is provided with a plurality of horizontal wheels 26, **26*a*, 26*c*, etc., which horizontal wheels 64, 64*a*, 64*b* and 64*c* are connected by vertical axles 65 and 65*a* within track guide means 26. The track guide 26 is disposed above the bottom wall 19 of the track 2 by means of ball bearings 66 and 66*a* for smooth movement of the track guide means 25 and 26 within the track 2. The track 2 is elevated above the ground by means of joints 67 67*a*, etc. They are kept there maintained at ground level, and are anchored in place by footings 68 and 68*a*, disposed to joint 67 and 67*a* of track 2**.

Likewise, at the other end the contacts strips 16, 17 and 18 of cart 1 are disposed to reciprocal magnetic contacts at the house end and namely, at contact strips 16A, 17A and 18A. Strip 16A at the home is for the positive end of the timer. Strip 17A is a magnetic contact for the positive end of the battery charger. Strip 18A is common ground for the charger and the timer at the house location.

The battery 48 is charged by battery charger 48A, and it is timed by programmable timer 70, generally having a 12 volt DC output. Relay 52 and 52A regulate the flow of electricity within the system. A fuse 71 blocks the electrical charge in the battery from going beyond the battery to the relays. A diode 72 is provided to keep electric current flowing one direction.

The cart 1 is activated by electrical motor 47, powered by 12 volt battery 48, which is regulated from a programmable timer unit 70 at the house location 4 of the present invention. Typically, the timing unit utilizes a control XT, which is a programmable microprocessor-based timing device.

Once the 12 volt impulse hits the relay contacts 52 and 52A, power is supplied to the reversible drive motor 47. Battery 48, also located in the Cart 1 is generally a 12 volt battery, but smaller than an automotive battery. The respective pluralities of contacts 14, 15, 16, 17 and 18, may engage until the cart 1 reaches the other end 3 or 4 of the track 2. The Cart 1 has large bumper type switches located at either end for safety shut-off and end of destination shut-off. The switches release the hold contacts, thus removing voltage supplied to the motor 47. The cart 1 will remains at the street end 3 of the track 2 until the programmable timer 70 supplies voltage for the return cycle at the desired time. The same type of electronic components are used for the return cycle as in the forward cycle. Diodes are used to protect 12-volt battery supply 48 from the output of programmer 70. The fusible link 71 acts to keep the charge from going beyond the battery 48 to the relays 52 and **52*a***.

At the house end 4 of the track 2, three stainless steel magnetic contacts 16A, 17A and 18A are provided. Strip 16A is for the positive end of the programmable timer, and strip 17A is for the positive end of the battery charger, and strip 18A is a common ground for the other two contacts. At the driveway end 3 of the track 2 there are only two magnetic contacts 14A and 15A. Contact 14A is for the connection to the positive end of the programmable timer and contact 15A is for connecting to the negative end of the programmable timer. These contacts connected by 18 gauge pairs of wires 73 and 74 adjacent to the track.

An optional feature is a vacuum function to clean out the track 2 during use. The track 2 may be countersunk in a side walk or in a driveway, or else secured by footings 58, 58A, etc. within the ground.

Optionally, a heated version may be provided to facilitate operating in freezing conditions. The system has a timing system that turns on a garbage delivery at a predetermined hour. After the garbage is collected, cart 1 reverses itself by the programmable timer 70 and returns to house location 4 later.

The cart unit 1 has a built-in pressure sensitive bumpers 12 and 13 to cut off power temporarily if the unit 1 encounters an obstacle such as a small child or anything in the path of the unit.

FIGS. 9 and 10 show alternate versions wherein a chair or a child amusement device are provided on the Unit 1 for transportation and recreational purposes.

It is noted that the steering of guidance members 25 and 26 are typically made of nylon so they can turn around curves smoothly.

In a further optional version, the transmission may be by remote control with no need for the conductor wires 73 and 74 to connects the contacts to the programmable timer.

The invention is an improvement of the prior art in that it provides for a movable track and garbage receptacle cart which is movable at specified times from a house location to a curbside destination. Furthermore, the cart is provided with mechanisms for lifting cart 1 above any obstacle such a small mound of snow or leaves in the path of the track, without removal of the steering guidance members from the track. It is noted that the cart 1 does not proceed when in contact with a larger obstacle, such as a small child or pet.

This invention relates to a household trash delivery system extending from a house to a curbside pick-up area. The trash is carried on a cart which will remains at a street end of the track until a predetermined programmed times for a pickup, which time the cart returns to the house.

Other modifications made to the present invention without departing from the stated scope of the claims.

I claim:

1. A household trash delivery system, comprising:

A shuttle cart for shuttling back and forth at ground level between a destination at a house and a curbside trash delivery destination, to permit convenient and automatic delivery of trash at any time and under most weather conditions, said shuttle cart being capable of locomotion and obstacle avoidance; said shuttle cart being controlled by electrical and mechanical means; and said shuttle cart being directionally guided by a guidance system;

said device further having a reversible electric motor and a drivewheel mechanically connected thereto, wherein locomotion of said shuttle cart is provided by the drive wheel, the drive wheel being forced to turn when energy is supplied to the reversible electric motor;

said reversible electric motor being capable of driving said shuttle cart in a forward and a backward direction, the forward direction being from the house destination to the trash delivery destination, and the backward direction being from the trash delivery destination to the house destination;

wherein said shuttle cart is provided with a rechargeable battery, the battery for supplying energy to the reversible electric motor; the trash delivery system further having a battery recharger disposed in the house, the recharger for recharging the battery when the shuttle cart is located at the house;

said shuttle cart having a plurality of bumper safer switches capable of delivering an electric impulse, and a plurality of electrical relays each relay comprising a switch, the relay switch being for connecting and disconnecting the energy supply from the rechargeable battery with the reversible electric motor; the electrical relays being responsive to impulses delivered by a timer and further responsive to electrical impulses delivered by the bumper safety switches;

wherein said plurality of electrical relays includes a first and a second electrical relay, each comprising an electric switch for connecting and disconnecting the energy supply from the rechargeable battery with the reversible electric motor; said electric relays responding to electric impulses from the timer by closing the reversible motor switch and thereby supplying current to the reversible motor; said device further having a first and a second bumper safety switch, said first and second bumper safety switches being electrically connected to said respective first and second electric relays, said bumper safety switches being further capable of producing an electric impulse when mechanically impacted; the electric impulses from said first and second bumper safety switches being electrically transmitted to said respective first and second electric relays; the first and second electric relays responding to electric impulses from said respective first and second bumper safety switches by opening the reversible electric motor switch, thereby disconnecting current flowing to the reversible electric motor;

said first and second electric relays being directional relays; said first relay being for the forward direction and said second relay being for the backward direction; and first relay comprising an electric switch for connecting and disconnecting the energy supply from the rechargeable battery with the reversible electric motor to produce forward motion of said shuttle cart; said second relay comprising an electric switch for connecting and disconnecting the energy supply from the rechargeable battery with said reversible electric motor to produce backward motion of said shuttle cart; and, said first bumper safety switch being a forward direction bumper safety switch; and said second bumper safety switch being a backward direction bumper safety switch; and further where said forward bumper safety switch is capable of stopping the forward motion of said shuttle cart when said forward bumper safety switch is mechanically impacted; and, further, where said backward bumper safety switch is capable of stopping the backward motion of said shuttle cart when the backward bumper safety switch is mechanically impacted; said shuttle cart electrical control means comprising said first and second electric relays, said first and second bumper safety switches, and said timer;

wherein the guidance system comprises a pair of elongated, substantially vertical steering posts having an upper end and a lower end, the steering post lower end comprising a rolling end member, the steering post rolling end members further being provided with a plurality of freely turnable wheels, the freely turnable wheels being horizontally mounted upon the steering post rolling end members to permit substantially frictionless contact of the rolling end member with surrounding surfaces; the guidance system further comprising an elongated track, the track comprising a path along which the shuttle cart moves in forward and backward directions; the track further comprising a hollow channel-like enclosure for accepting and contacting the freely turnable horizontally mounted wheels mounted upon the steering post rolling end members, the hollow enclosure further having a top side, the top side being provided with an open passageway for permitting the through-insertion of the steering posts and allowing the continuous movement of the steering posts along the length of the hollow channel-like enclosure as the shuttle cart moves forward and backward along the elongated track, the open passageway disposed on the top side of the hollow channel-like enclosure extending along the entire length of the enclosure.

2. The device of claim 1, wherein said shuttle cart is provided with a frame and a spaced apart pair of wheel-and-axle assemblies comprising a pair of freely and universally rotatable axles each respectively and universally rotatably attached to said frame, and further, each respective wheel-and-axle assembly having a central bore therethrough, each respective axle being provided with a pair of freely turnable wheels, said wheel-and-axle assemblies being attached to said frame and further for providing rolling mechanical support for said shuttle cart, the free rotatability of the axles for permitting said shuttle cart to travel in either a straight line or in a curve.

3. The device of claim 2, wherein said shuttle cart frame is provided with a pair of bores therethrough, said frame bores respectively being in register with said respective axle central bores, further where said respective steering posts extend vertically downward from a point above said frame so as to pass downwardly through said respective registered bores of said frame and respective axles, each respective registered through-bore being further provided with a ball-bearing bushing for receiving and holding said respective steering posts in substantially frictionless movable relationship.

4. The device of claim 3 wherein said steering posts respond to a curve in said shuttle cart track by applying a horizontal component of force to said shuttle cart frame, thereby causing said axles to rotate and the direction of movement of said cart to alter as a curve is encountered.

5. The device of claim 4, wherein said steering posts are capable of vertical motion relative to said shuttle cart frame, the vertical motion being permitted by said respective ball bearing bushings, the relative vertical motion of said steering posts for allowing said frame of said shuttle cart to smoothly and easily negotiate bumps, depressions and imperfections in the ground surface over which said shuttle cart must travel, and further, for allowing said frame of said shuttle cart to smoothly and easily climb over small obstacles in the path of said shuttle cart while maintaining a load carried by said shuttle cart in substantial positional equilibrium, said frame, said wheel-and-axle assemblies, said steering posts, said steering post rolling end members comprising the shuttle cart mechanical control means and said track, said steering posts, and said steering post rolling end members comprising said shuttle cart guidance system.

6. The device of claim 5, further having a first, a second and a third electrical contact at the house destination, said shuttle cart further having respective first, second and third electrical contacts, said respective first, second and third electrical contacts of the house destination and said shuttle cart being positionally disposed so that said first, second and third electrical contacts of said shuttle cart are in register to make electrical contact with said respective first, second and third electrical contacts of the house destination when said shuttle cart is located at the house destination.

7. The device of claim 6, wherein said first respective electrical contacts of said shuttle cart and the house destination comprise an electrically positive direct current terminal; wherein said respective second electrical contacts of said shuttle cart and house destination comprise an electrically negative direct current terminal; and said respective third electrical contacts of said shuttle cart and the house destination comprise a common electrical ground contact, said respective first, second and third electrical contacts for permitting recharging of said rechargeable shuttle cart battery by the recharger while said shuttle cart is at the house destination and for permitting an electrical impulse from the timer to initiate forward motion of said cart from the house destination to the curbside trash pickup destination.

8. The device of claim 7, further having a fourth and a fifth electrical contact at the curbside trash pickup destination, said shuttle cart further having respective fourth and fifth electrical contacts, said respective fourth and fifth electrical contacts of the curbside destination and said shuttle cart being positionally in register to make electrical contact when said shuttle cart is located at the curbside destination.

9. The device of claim 8, further wherein said respective fourth electrical contacts are electrically positive and said respective fifth electrical contacts are electrically negative, said fourth and fifth electrical contacts of the curbside destination being in electrical connection with the timer, for sending an electrical impulse to said cart to initiate backward movement when said cart is located at the curbside destination.

* * * * *